(12) United States Patent
Won et al.

(10) Patent No.: US 8,508,602 B2
(45) Date of Patent: Aug. 13, 2013

(54) PHOTOGRAPHING APPARATUS METHOD, AND COMPUTER USABLE MEDIUM FOR PHOTOGRAPHING AN OBJECT WITHIN A DETECTION AREA BASED ON A CHANGE OF THE OBJECT

(75) Inventors: Jung-yoon Won, Suwon-si (KR); Nyun-woo Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/702,417

(22) Filed: Feb. 9, 2010

(65) Prior Publication Data

US 2010/0201837 A1  Aug. 12, 2010

(30) Foreign Application Priority Data

Feb. 11, 2009 (KR) .................. 10-2009-0011218

(51) Int. Cl.
*H04N 5/225* (2006.01)
(52) U.S. Cl.
USPC .................. 348/208.14; 348/222.1
(58) Field of Classification Search
USPC ............................ 348/222.1, 208.11
See application file for complete search history.

(56) References Cited

U.S. PATENT DOCUMENTS

| | | | | |
|---|---|---|---|---|
| 2002/0049728 | A1* | 4/2002 | Kaku | 707/1 |
| 2003/0202685 | A1* | 10/2003 | Shimizu et al. | 382/118 |
| 2007/0018069 | A1* | 1/2007 | Higashino | 250/200 |
| 2008/0008361 | A1* | 1/2008 | Nozaki et al. | 382/118 |
| 2008/0159628 | A1* | 7/2008 | Yoshida | 382/190 |
| 2008/0170132 | A1* | 7/2008 | Yi et al. | 348/222.1 |
| 2009/0102940 | A1* | 4/2009 | Uchida | 348/222.1 |
| 2009/0102942 | A1* | 4/2009 | Yoshizumi et al. | 348/222.1 |
| 2009/0115868 | A1* | 5/2009 | Kim et al. | 348/222.1 |

* cited by examiner

*Primary Examiner* — Gevell Selby
(74) *Attorney, Agent, or Firm* — Drinker Biddle & Reath LLP

(57) ABSTRACT

A photographing apparatus includes a photographing device for photographing an image of an object and converting the photographed image to an electric signal, an image conversion unit for converting the electric signal of the photographing device to image data, a detection area setting unit for setting a part of an image produced by the image data as a detection area, a detection unit for detecting a change of the object and generating a detection signal, and a photographing control unit for operating the photographing device and performing photography based on the detection signal.

19 Claims, 8 Drawing Sheets

PHOTOGRAPHING APPARATUS METHOD, AND COMPUTER USABLE MEDIUM FOR PHOTOGRAPHING AN OBJECT WITHIN A DETECTION AREA BASED ON A CHANGE OF THE OBJECT

CROSS-REFERENCE TO RELATED PATENT APPLICATIONS

This application claims the benefit of Korean Patent Application No. 10-2009-0011218, filed on Feb. 11, 2009, in the Korean Intellectual Property Office, the disclosure of which is incorporated herein in its entirety by reference.

BACKGROUND

The present invention relates to a photographing apparatus and method, and more particularly, to a photographing apparatus and method in which a part of an image to be photographed is set to be a detection area and photographing is automatically performed by detecting a change of an object so that a dynamic change of the object may be easily photographed.

Photographing apparatuses such as digital cameras or digital camcorders are apparatuses to convert light reflected from an object to an electric signal, store image data in a storage medium, and process or reproduce the stored image data. The digital camera may directly monitor an image of the photographed object without a complicated film development/printing process performed in a film camera. Also, since the image may be easily edited and processed by using a digital medium, the digital camera is rapidly replacing film cameras.

The photographing apparatus performs photoelectric conversion of an image light formed by an optical system including a lens into an electric signal by using a photoelectric conversion device such as a charge coupled device (CCD) or a complementary metal oxide semiconductor (CMOS) device. Then, a predetermined image process is performed to the photoelectric converted image signal so that a still image or a motion picture may be output.

Recently, the digital camera has been equipped with a variety of convenient functions, such as automatic detecting and photographing of a face of a person or automatic detecting and photographing of a smiling face. Also, to facilitate use of a digital camera by a user, a variety of modes having a preset exposure or aperture value according to various photographing situations, for example, a landscape mode, a portrait mode, a night scene mode, and a sports activity mode, are provided.

However, the photographing apparatus such as the digital camera may not be able to freely photograph an object in response to a variety of special situations. For example, a user of a digital camera may want to photograph an object, like insects or birds, that move from time to time, or a scene of runners at a starting position, or a scene of blowing out candles at a birthday party. Even when the user of a digital camera has prepared for the special scene by setting the digital camera suitable for each scene to photograph a desired scene, the user may perform photography by pressing a shutter at a time when the object abruptly moves. That is, the user's fast reaction or photography techniques are required to capture the motion of the object that continuously moves.

SUMMARY

To solve the above and/or other problems, the present invention provides a photographing apparatus and method by which anyone can easily photograph a dynamic change of an object without special photography techniques.

The present invention provides a photographing apparatus and method by which the motion of an object is detected and thus photography is automatically performed.

Various embodiments of the present invention provide a photographing apparatus and method by which a user may freely set an area of an object whose motion is detected for photography.

According to an aspect of the present invention, a photographing apparatus includes a photographing device for photographing an image of an object and converting the photographed image to an electric signal, an image conversion unit for converting the electric signal of the photographing device to image data, a detection area setting unit for setting a part of an image produced by the image data as a detection area, a detection unit for detecting a change of the object and generating a detection signal, and a photographing control unit for operating the photographing device and performing photography based on the detection signal.

The detection unit may detect a change of the object in the detection area by recognizing a change in at least one of brightness, saturation, and edge.

When the object to be detected is a person, the detection unit may recognize a face of the person and detects a change in the expression of the face.

The photographing apparatus may further include a sensitivity setting unit for setting a range of a change, wherein the detection unit generates the detection signal, and the photographing control unit operates the photographing device.

When a change in the detection area may be within the range of a change set by the sensitivity setting unit and the object to be detected is out of the detection area, the detection area setting unit changes the detection area according to the movement of the object.

The photographing apparatus may further include a display unit for displaying an image photographed by the photographing device, and a user input unit for receiving an input by a user, wherein the detection area setting unit sets the detection area in the image displayed on the display unit based on a signal input from the user input unit.

The photographing apparatus may further include a touch screen for displaying an image photographed by the photographing device and detecting a touch on a surface and generating a signal corresponding to a detected position, wherein the detection area setting unit sets the detection area based on the signal detected on the surface of the touch screen.

The detection area setting unit may change the detection area to another position in the image according to an input by a user.

The detection area setting unit may change the size of the detection area by an input by a user.

According to another aspect of the present invention, a photographing method includes setting a part of an image to be photographed as a detection area, detecting a change of an object in the detection area, and performing photography when a degree of the change of the object exceeds a preset sensitivity range.

The photographing method may further include tracking the object by changing the detection area according to the movement of the object when a change in the detection area is within the present sensitivity range and the object to be detected is out of the detection area.

The photographing method may further include displaying an image that is to be photographed, and receiving an input by a user, wherein, in the setting of a part of an image to be photographed as a detection area, the detection area is set in the image displayed based on the input by the user in the receiving of an input by a user.

A computer program product may be provided, comprising a computer usable medium having a computer readable program code embodied therein, the computer readable program code adapted to be executed to implement a method for photographing as described above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Figure 1:
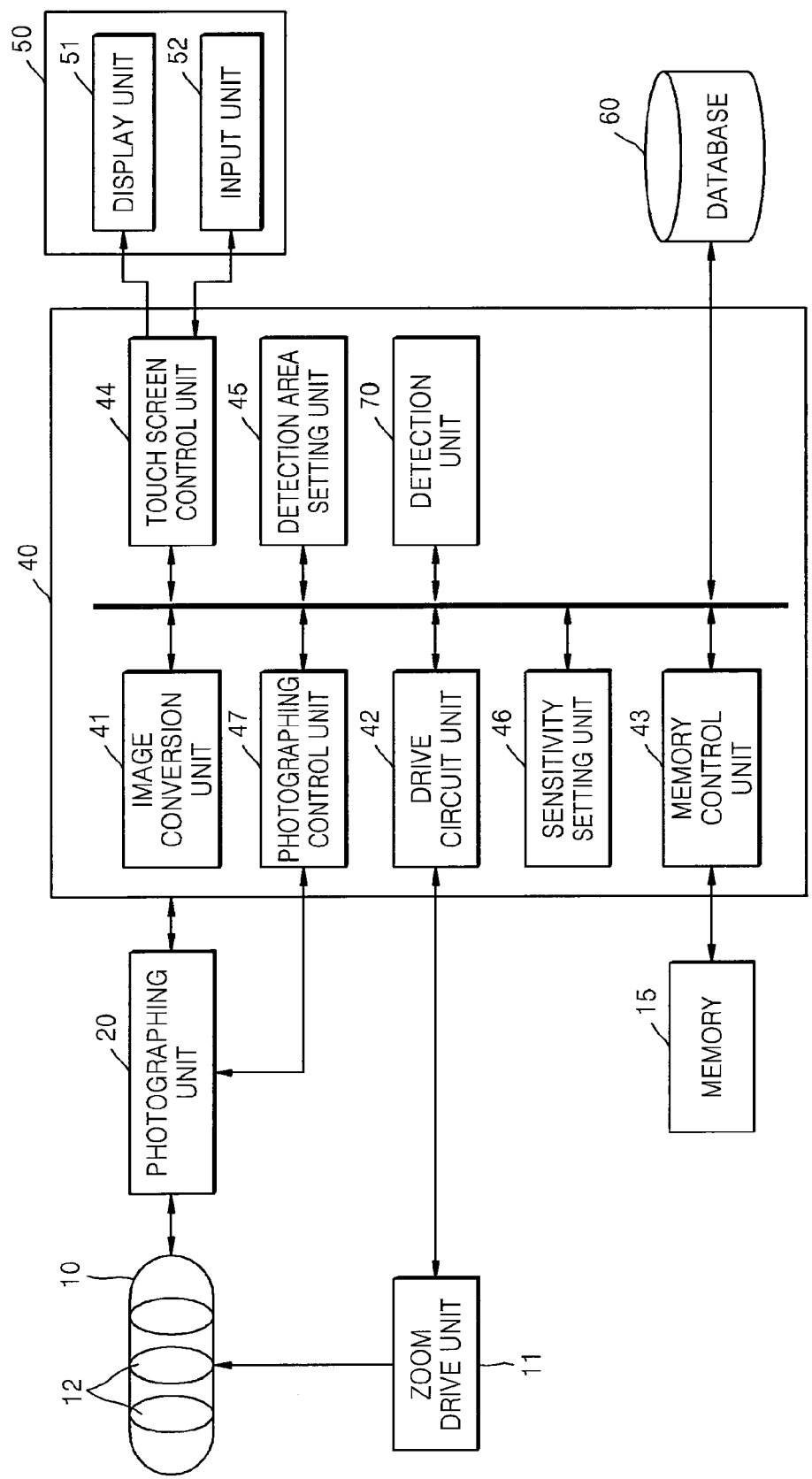
FIG. 1 is a block diagram illustrating the constituent elements of a photographing apparatus according to an embodiment of the present invention.

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

FIG. 1 is a block diagram illustrating the constituent elements of a photographing apparatus according to an embodiment of the present invention. Referring to FIG. 1, the photographing apparatus according to the present embodiment includes a photographing device 20 for photographing an image of an object and converting the photographed image to an electric signal, an image conversion unit 41 for converting the electric signal of the photographing device 20 to image data, a detection unit 70 for detecting a change of an object and generating a detection signal, and a photographing control unit 47 for performing photography by operating the photographing device 20.

A zoom lens unit 10 arranged in front of the photographing device 20 includes a plurality of lenses 12 to form an image of external image light on a photographing surface of the photographing device 20. The lenses 12 are arranged with variable intervals therebetween. When the intervals of the lenses 12 vary, the magnification ratio of the zoom lens unit 10 is changed.

The lenses 12 are driven by a zoom drive unit 11 having a drive unit such as a zoom motor so that the relative positions of the lenses 12 may be changed. The zoom drive unit 11 is operated in response to a control signal output by a drive circuit unit 10 of a control unit 40. Thus, the zoom drive unit 11 may drive the zoom lens unit 10 to have any one of a plurality of magnification ratios.

The photographing device 20 includes a photoelectric conversion device such as a charge coupled device (CCD) or a complementary metal oxide semiconductor (CMOS) device to convert image light input through the zoom lens unit 10 to an electric signal. The process of converting the image light to an electric signal may include an operation of converting the image light to an analog signal and an operation of converting the analog signal to a digital signal.

The control unit 40 is electrically connected to the photographing device 20, the zoom drive unit 11, and a touch screen 50, and communicates control signals with constituent elements of the photographing apparatus to control the operations of the respective constituent elements, or processes data. The control unit 40 includes the image conversion unit 41, a drive circuit unit 42, a memory control unit 43 for controlling storing of data in a memory 15, a touch screen control unit 44, a detection area setting unit 45, a sensitivity setting unit 46, the photographing control unit 47, and the detection unit 70.

The control unit 40 may be implemented by a microchip or a circuit board having the microchip. The respective constituent elements included in the control unit 40 may be implemented by software or circuits included in the control unit 40.

The memory control unit 43 controls recording of the image data on the memory 15 or reading out of the image data or setting information recorded on the memory 15. The memory 15 may be formed of a semiconductor memory device, for example, a synchronous DRAM (SDRAM), to store the photographed image data.

The detection area setting unit 45 sets a part of an image representing the image data as a detection area. The detection unit 70 detects a change of the object and generates a detection signal. The photographing control unit 47 controls the photographing device 20 to perform photography.

The sensitivity setting unit 46 sets a range (sensitivity) of a change of the object that makes the detection unit 70 generate a detection signal so that the photographing control unit 47 may operate the photographing device 20 to perform photography.

When the object is photographed by the photographing device 20, an electric signal is generated and converted to image data by the image conversion unit 41. The detection unit 70 may detect a change of the object from the image data. When the change of the object exceeds the range of a change preset by the sensitivity setting unit 46, the detection unit 70 generates a detection signal. The image data used by the detection unit 70 to detect a change is image data related to an image photographed by the photographing device 20 to perform preliminary photographing, that is, a preview mode, before a final photographing (a main photographing) is performed.

When the detection signal is generated, the photographing control unit 47 determines that a change is generated in the object and operates the photographing device 20 to perform photography (the main photographing).

The photographing apparatus includes the touch screen 50 which includes a display unit 51 for displaying an image of the image data and an input unit 52 for selecting a part of the image displayed on the display unit 51. The touch screen 50 performs a function to display an image photographed by the photographing device 20 and a function to detect a touch on a surface of the touch screen 50 and generate a signal corresponding to the position of the detected touch.

The touch screen 50, which is one of input devices replacing keyboards or mice, performs a desired work by touching the surface of a display using a finger or pen and enables intuitive performance of a work under a graphic user interface (GUI) environment. The display unit 51 of the touch screen 50 may use a display device such as a liquid crystal display (LCD) or an organic light emitting diode (OLED) display.

The input unit 52 is installed on the surface of the display unit 51 and may detect a touch of the surface thereof. A variety of technologies such as a resistive detection method, a capacitive detection method, a surface sound wave detection method, an infrared (IR) ray detection method, and an optical detection method may be used for the input unit 52.

A user contacts the input unit 52 of the touch screen 50 to set a part of an image displayed on the display unit 51 as a detection area. The detection area setting unit 45 may set a detection area based on a signal detected from the input unit 52 of the touch screen 50.

The setting of a detection area directly by a user is not limited to the use of the touch screen 50 only, and may be implemented in a variety of forms. For example, when an image is displayed on the display unit 51, the user may set a detection area by operating a user input unit (not shown) such as a menu button or a dial provided in the photographing apparatus.

Figure 2:
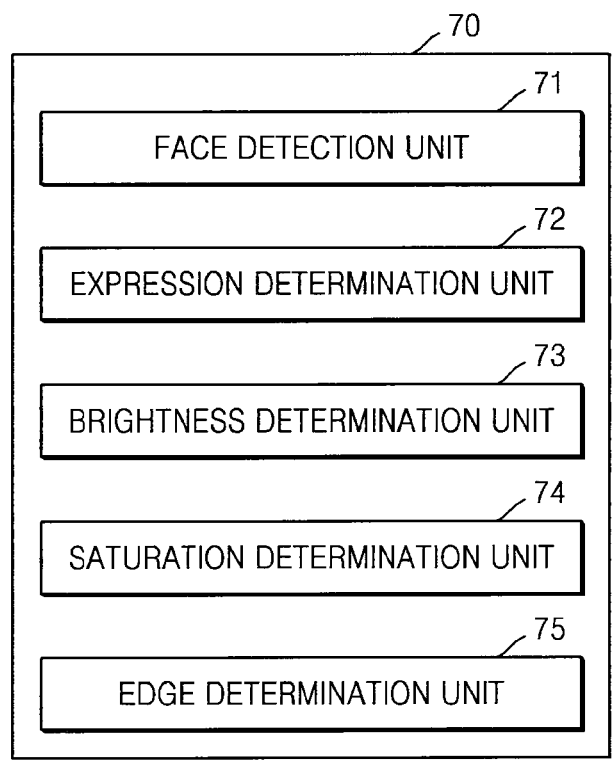
FIG. 2 is a block diagram illustrating the detailed structure of a detection unit of the photographing apparatus of FIG. 1.

FIG. 2 is a block diagram illustrating the detailed structure of the detection unit 70 of the photographing apparatus of FIG. 1. Referring to FIG. 2, the detection unit 70 includes a face detection unit 71, an expression determination unit 72, a brightness determination unit 73, a saturation determination unit 74, and an edge determination unit 75. The detection unit 70 may perform a method of detecting a change in different ways according to the type of an object to be detected by the photographing apparatus or a mode for photography, for example, a mode to photograph a person or a mode to detect and photograph a change in motion of, for example, an animal, by using the above constituent elements.

Figure 3:
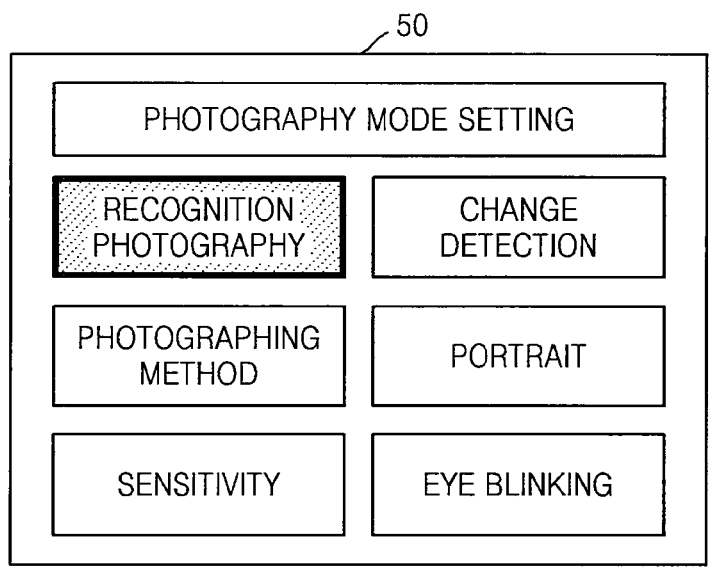
FIG. 3 is an operation state screen diagram illustrating a screen for selecting a photography mode in the photographing apparatus of FIG. 1.

FIG. 3 is an operation state screen diagram illustrating a screen for selecting a photography mode in the photographing apparatus of FIG. 1. Referring to FIG. 3, when a "Change Detection" menu is selected from the menu displayed on the touch screen 50, the photographing apparatus detects and photographs a motion of an object such as animal. When a "Recognition Photography" menu is selected, the photographing apparatus recognizes and photographs a face of a person or a change in the expression such as eye blinking.

The face detection unit 71 detects a face area corresponding to the face of a person from the image data. A variety of commonly known face recognition methods may be used to detect the face of a person. For example, a face recognition technique using geometrical features of a face may be used. According to the face recognition using geometrical features, the face of each individual is recognized by using geometrical factors such as positions, sizes, and intervals of characteristic points of a face, such as the eye, nose, and mouth.

The expression determination unit 72 determines a change in the expression by detecting whether a change has been generated in a particular portion, for example, an eye or a lip, of the face area detected by the face detection unit 71. Thus, the detection unit 70 may recognize the face of a person when the object to be detected is a person and generate a detection signal when a change has been generated in the expression such as eye blinking or lip movement.

The bright determination unit 73, the saturation determination unit 74, and the edge determination unit 75 are used to detect a change in the object during photography by capturing an important instance of a dynamic scene such as a scene of runners at a starting position or a scene of blowing out candles at a birthday party, or when the object to be detected is an animal. Thus, the detection unit 70 may detect a change in the object in a detection area by recognizing at least any one of changes in brightness, saturation, and edge.

A database 60 may store, in advance, standard data used when the detection unit 70 determines a change of the object. The detection unit 70 may recognize a face, determine a change in the expression in the face, and determine a change in the brightness, saturation, and edge, based on the standard data recorded in the database 60.

Figure 4:
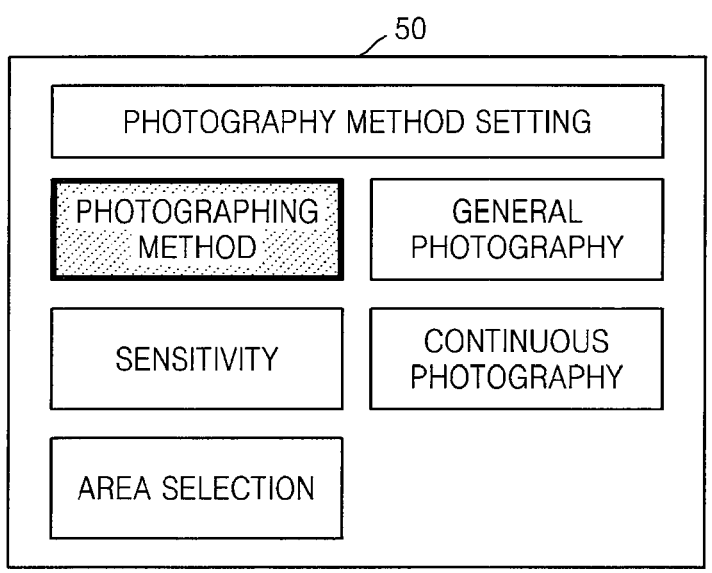
FIG. 4 is an operation state screen diagram illustrating a screen when a photography method menu is selected from the screen of the photographing apparatus of FIG. 3.
Figure 5:
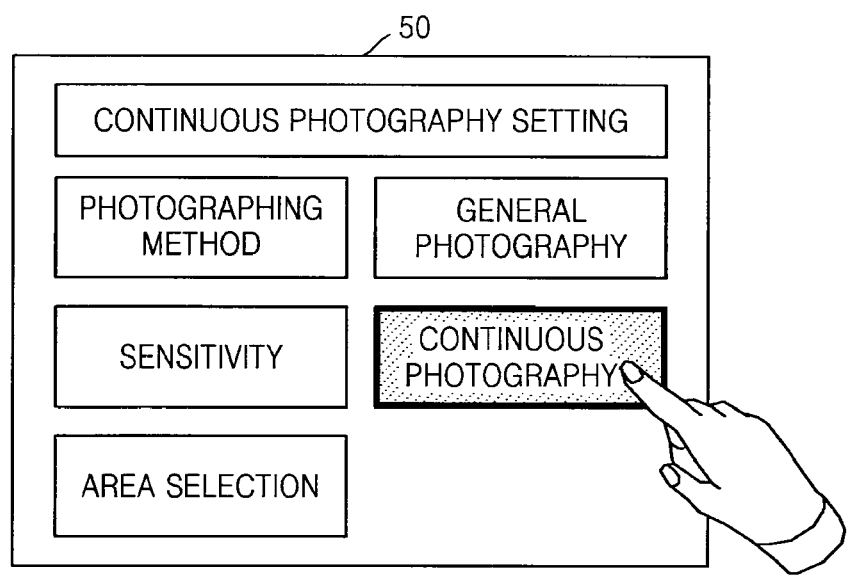
FIG. 5 is an operation state screen diagram illustrating a screen for selecting a continuous photography menu as a photography method from the screen of the photographing apparatus of FIG. 4.
Figure 6:
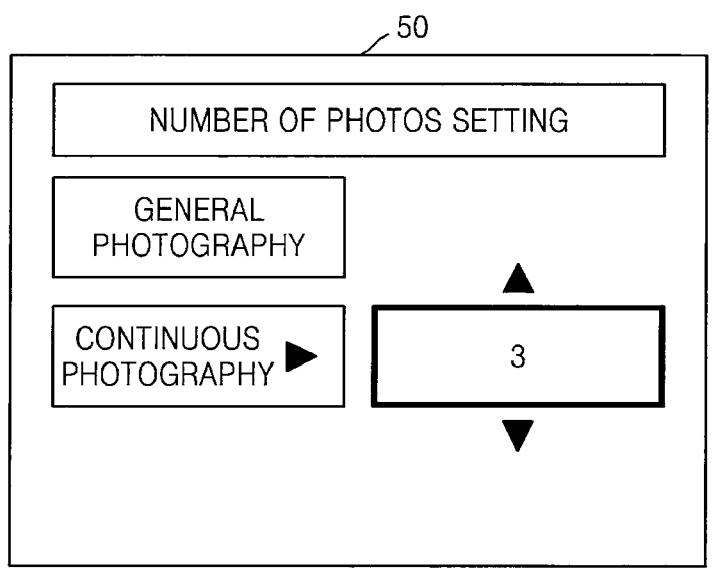
FIG. 6 is an operation state screen diagram illustrating a screen for setting the number of photos to be photographed by selecting the continuous photography menu from the screen of the photographing apparatus of FIG. 4.

FIG. 4 is an operation state screen diagram illustrating a screen when a photography method menu is selected from the screen of the photographing apparatus of FIG. 3. FIG. 5 is an operation state screen diagram illustrating a screen for selecting a continuous photography menu as a photography method from the screen of the photographing apparatus of FIG. 4. FIG. 6 is an operation state screen diagram illustrating a screen for setting the number of photos to be photographed by selecting the continuous photography menu from the screen of the photographing apparatus of FIG. 4.

As illustrated in FIG. 4, the user may set in advance whether to perform continuous photography or general photography to photograph one photo when the photographing control unit 47 operates the photographing device 20 to perform photography. To perform continuous photography, the user may select a "Continuous" menu of the touch screen 50 and input the number of photos to be photographed.

Figure 7:
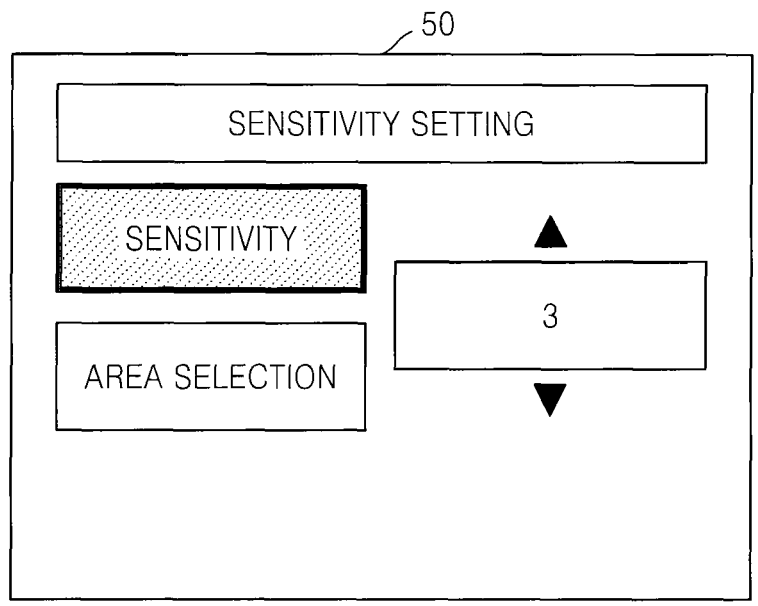
FIG. 7 is an operation state screen diagram illustrating a screen for setting sensitivity by selecting the sensitivity menu from the screen of the photographing apparatus of FIG. 4.

FIG. 7 is an operation state screen diagram illustrating a screen for setting sensitivity by selecting the sensitivity menu from the screen of the photographing apparatus of FIG. 4. Referring to FIG. 7, the user may set the range of a change of the object to be photographed, in which the detection unit 70 generates a detection signal so that the photographing control unit 47 may operate the photographing device 20, by selecting a "Sensitivity" menu from the touch screen 50. In the present embodiment of FIG. 7, the sensitivity may be set by numbers. For example, as the number increases, the sensitivity increases so that the detection unit 70 may sensitively detect a change of the object to be photographed.

Figure 8:
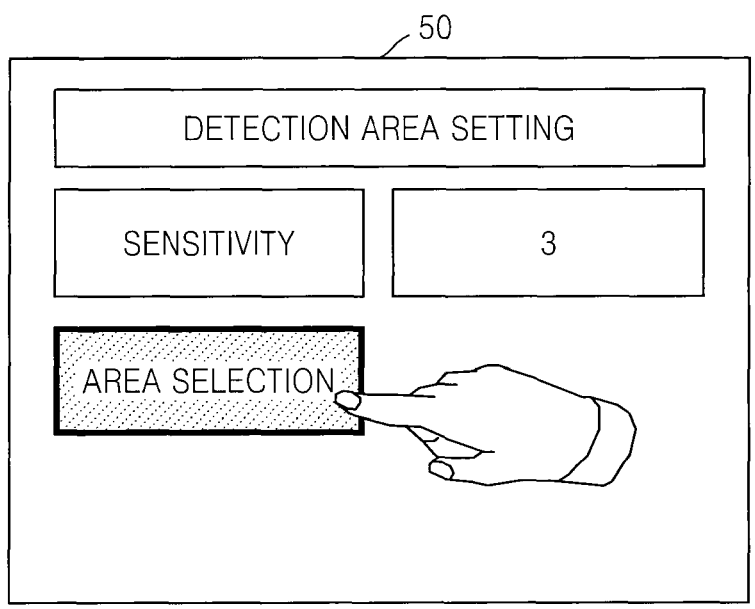
FIG. 8 is an operation state screen diagram illustrating a screen for selecting an area selection menu from the screen of the photographing apparatus of FIG. 7.
Figure 9:
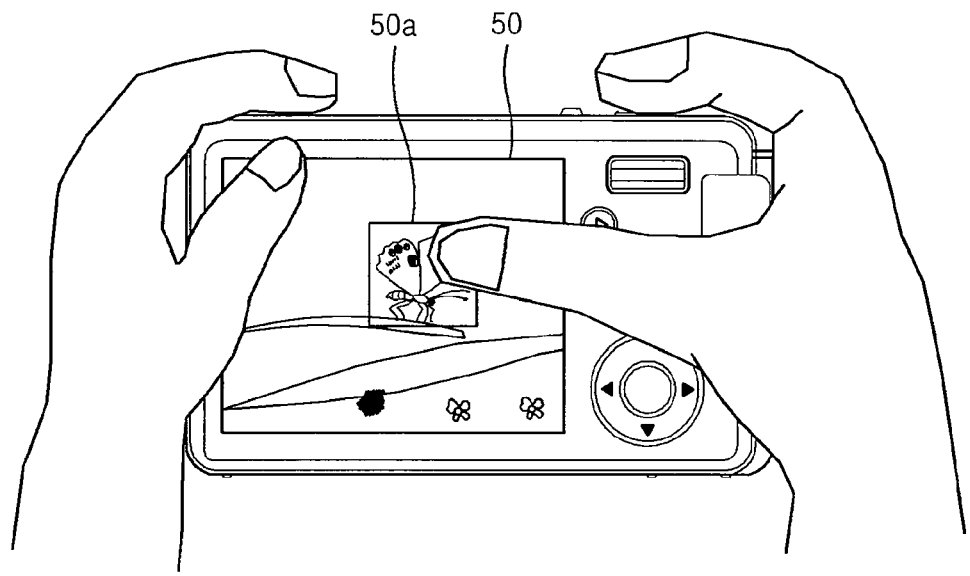
FIG. 9 is an operation state pictorial diagram illustrating that a detection area is set by selecting the area selection menu.

FIG. 8 is an operation state screen diagram illustrating a screen for selecting an area selection menu from the screen of the photographing apparatus of FIG. 7. FIG. 9 is an operation state screen diagram illustrating that a detection area is set by selecting the area selection menu.

Referring to FIGS. 8 and 9, when the user selects an "Area Selection" menu, an image photographed by the photographing device 20 is displayed on the touch screen 50. Then, when the user touches the touch screen 50, a rectangle 50a to set a detection area is displayed on the touch screen 50. The user may change the size and position of the rectangle 50a displayed on the touch screen 50 by drag touch. The drag touch is a touch method of touching and dragging a cursor, for example, the rectangle 50a in the present embodiment, on the surface of a touch screen for some distance. When the user's selection operation is completed, an area existing in the rectangle 50a is set to be a detection area.

Figure 10:
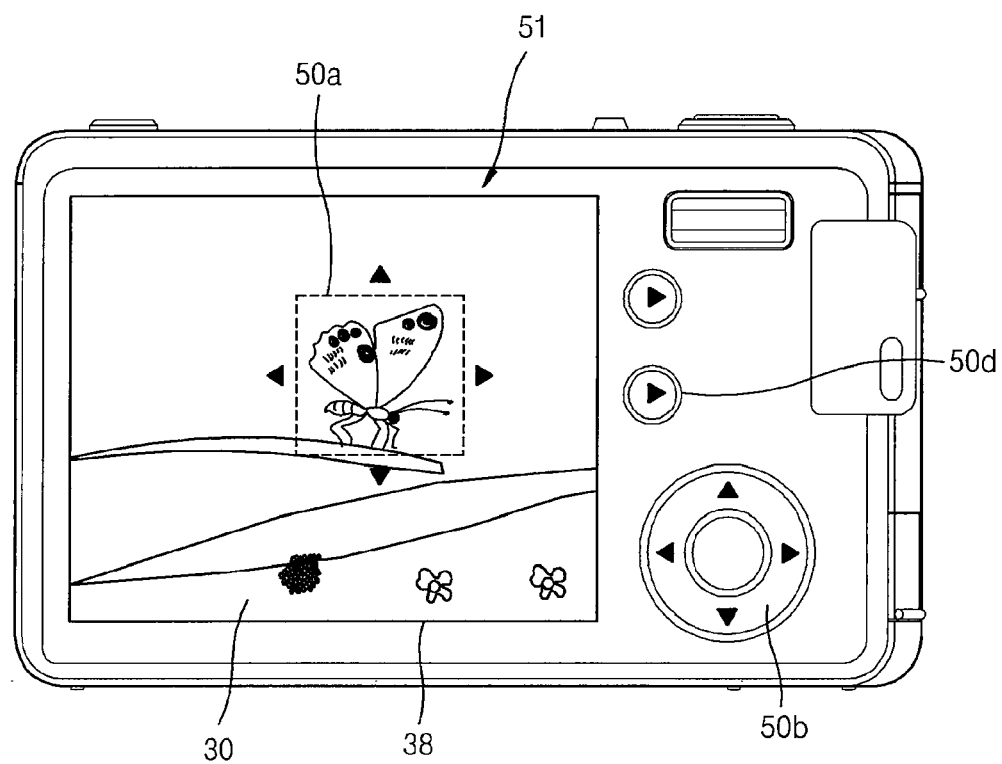
FIG. 10 is an operation state pictorial diagram illustrating that the detection area is changed in a screen of a photographing apparatus according to another embodiment of the present invention.

FIG. 10 is an operation state screen diagram illustrating that the detection area is changed in a screen of a photographing apparatus according to another embodiment of the present invention. Referring to FIG. 10, although the detection area where an object to be detected exists is set by directly operating the touch screen 50 as described above, the detection area may be set by adjusting the position and size of the rectangle 50a displayed on the display unit 51 by operating user input units 50b and 50c provided on the photographing apparatus as illustrated in FIG. 10.

Figure 11:
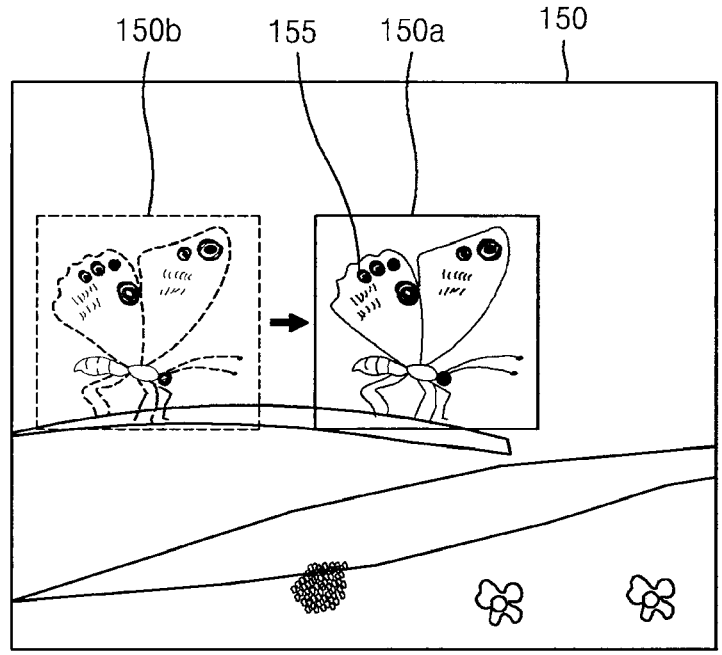
FIG. 11 is an operation state pictorial diagram illustrating that a tracking function is performed in a screen of a photographing apparatus according to another embodiment of the present invention.

FIG. 11 is an operation state screen diagram illustrating that a tracking function is performed in a screen of a photographing apparatus according to another embodiment of the present invention. Referring to FIG. 11, although the size and position of the detection area is adjusted by the user's operation on a screen displayed on the display unit of the photographing apparatus of the above-described embodiment, in the present embodiment illustrated in FIG. 11, the photographing apparatus may automatically change the position of the detection area according to the movement of the object. Such a function is referred to as an object tracking function.

For example, when a user wishes to capture and photograph an instant when a butterfly that is an object 155 flies, the left area of a display portion 150 where the object 155 is located is set to be a detection area 150b.

However, when the object 155 does not move, for example, slowly moves instead of flying, since a change in the movement of the object 155 is slower than the set range of a change, photography is not performed. The object 155 slowly moves from the left to the right on the display portion 150 and thus gets out of the detection area 150b that is initially set. The object tracking function is useful in this situation. When a change of the object in the detection area is within the range of a change set by the sensitivity setting unit 46 and the object to be detected gets out of the detection area, the detection area setting unit 45 changes the position of detection area according to the movement of the object thus setting the right side of the display portion 150 as a new detection area 150a. Accordingly, the photographing apparatus may effectively photograph a dynamic scene in which the object 155 suddenly flies.

Figure 12:
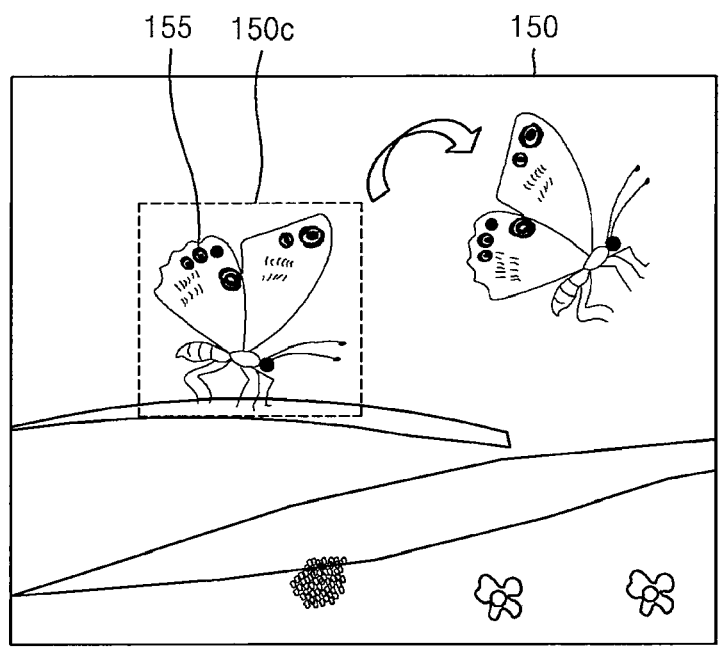
FIG. 12 is an operation state pictorial diagram illustrating that photography is performed in a screen of the photographing apparatus of FIG. 11.

FIG. 12 is an operation state diagram illustrating that photography is performed in a screen of the photographing apparatus of FIG. 11. Referring to FIG. 12, when a partial area, that is, an area where the object 155 exists, in the screen displayed on the display portion 150 is set as a detection area 150c, and the object 155 suddenly flies, a change of the object 155 in the detection area 150c exceeds the range of a change set by the sensitivity setting unit 46. Accordingly, the detection unit 70 generates a detection signal so that the photographing apparatus may perform photography by being controlled by the photographing control unit 47. As a result, the scene that the object 155 dynamically changes may be accurately photographed.

Figure 13:
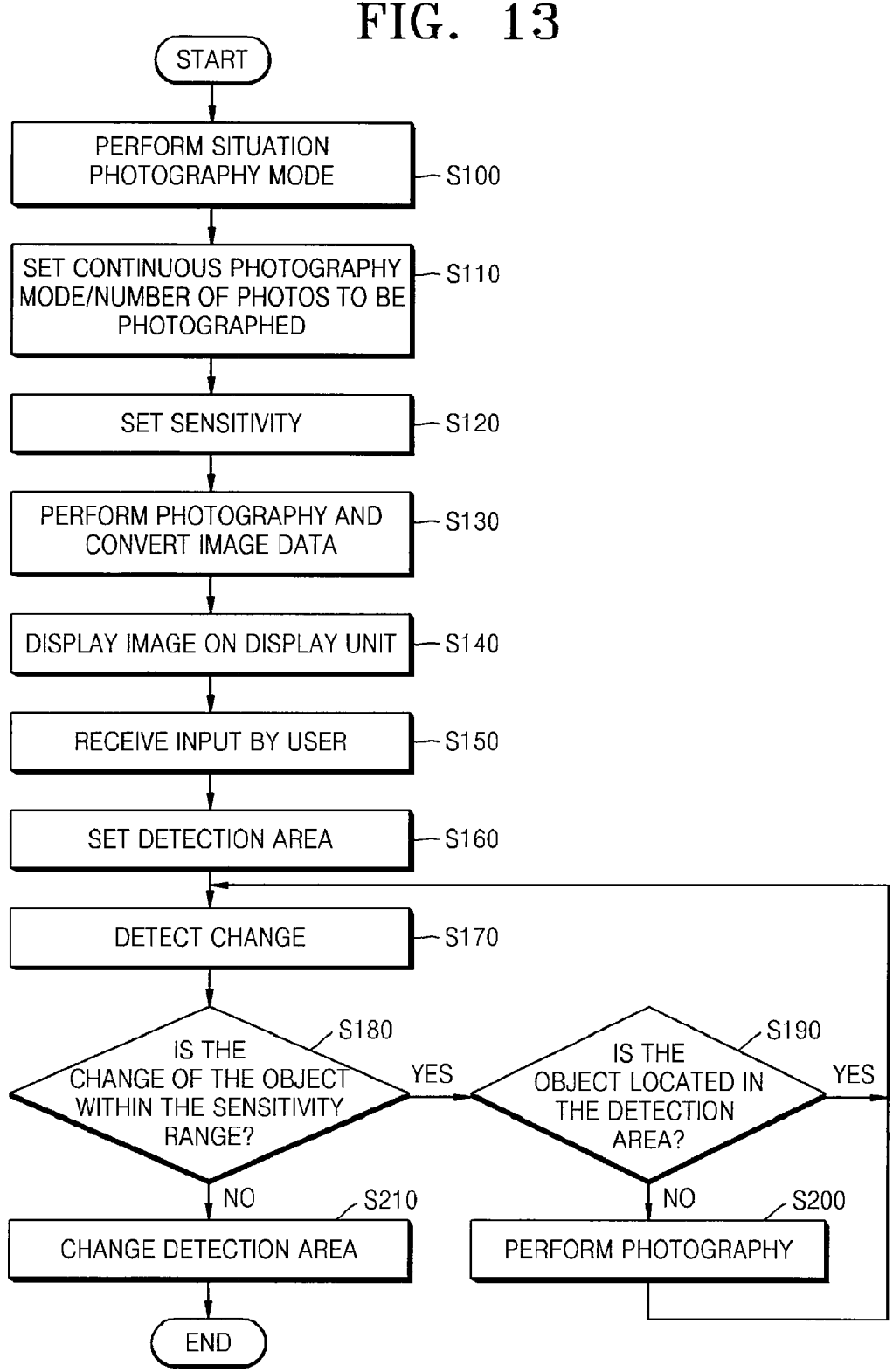
FIG. 13 is a flowchart for explaining the operations of a photographing method according to an embodiment of the present invention.

FIG. 13 is a flowchart for explaining the operations of a photographing method according to an embodiment of the present invention. Referring to FIG. 13, the photographing method according to the present embodiment includes the operations of setting a partial area of an image to be photographed as a detection area (S160), detecting a change of an object (S170), and performing photography (S200).

When a situation photography mode is performed to capture and photograph an instant scene of a special situation in the photographing apparatus (S100), the photographing method of the present embodiment is performed. Before photographing, any one of the general photography mode for photographing only one photo and the continuous photography mode is selected. When the continuous photography mode is selected, the number of photos to be photographed may be set (S110). Also, a sensitivity to detect a degree of a change of an object to be photographed may be set before photography (S120).

When the setting of sensitivity is completed in the operation S120, an image to be photographed by the photographing device is displayed on the display unit (S140). When an image is displayed on the display unit, an input by a user is received (S150). Then, a detection area is set based on the input by the user (S160). Thus, the user may set a detection area where the object to be detected exists by designating a partial area in the image displayed on the display unit.

When the detection area is set in the operation S160, a change of the object in the detection area is detected (S170). In the operation S170, a change in at least one of, e.g., brightness, saturation, and edge is recognized so that a change of the object in the detection area may be detected. When the object is a person in the operation S170, the face of the person is recognized so that a change in the expression of the face may be detected.

When a change of the object in the detection area is within the sensitivity range (S180) and the object to be detected is out of the detection area (S190), the object is tracked by changing the detection area according to the movement of the object may be performed (S210). Then, the detection of a change of the object in the changed detection area is performed again (S170). When the change of the object in the detection area is out of the sensitivity range, the photographing apparatus is operated to perform photography (S200).

As a result, the user may freely set and change the detection area of an object. Also, the user may effectively photograph a dynamic scene of the object since the object is automatically photographed without pressing a shutter at the moment the object suddenly moves.

As described above, in the photographing apparatus and method according to the present invention, a part of an image to be photographed is set as a detection area and photography is automatically performed by detecting a change of an object. Thus, anyone may easily photograph a dynamic change of the object without special photography techniques. Also, by operating a touch screen or a user input unit, a user may freely set the area of an object whose motion is detected for photography.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A photographing apparatus comprising:
    a photographing device configured to photograph an image of an object and convert the photographed image to an electric signal;
    an image conversion unit configured to convert the electric signal of the photographing device to image data;
    a detection area setting unit configured to set a part of an image produced by the image data as a detection area;
    a detection unit configured to detect a change of the object and to generate a detection signal if the change of the object exceeds a preset sensitivity range, wherein the detection area setting unit is further configured to change the detection area according to the movement of the object if the object to be detected is out of the detection area; and
    a photographing control unit for operating the photographing device and performing photography based on the detection signal.

2. The photographing apparatus of claim 1, wherein the detection unit is configured to detect, a change of the object in the detection area by recognizing a change in at least one of brightness, saturation, and edge.

3. The photographing apparatus of claim 1, wherein, the detection unit is further configured to recognize a face of the person and detect, a change in the expression of the face, if the object to be detected is a person.

4. The photographing apparatus of claim 1, further comprising a sensitivity setting unit configured to set the preset sensitivity range.

5. The photographing apparatus of claim 4, wherein, when a change in the detection area is within the preset sensitivity range set by the sensitivity setting unit and the object to be detected is out of the detection area, the detection area setting unit changes the detection area according to the movement of the object.

6. The photographing apparatus of claim 1, further comprising:
    a display unit configured to display an image photographed by the photographing device; and
    a user input unit configured to receive an input by a user,
    wherein the detection area setting unit is configured to set the detection area in the image displayed on the display unit based on a signal input from the user input unit.

7. The photographing apparatus of claim 1, further comprising:
    a touch screen configured to display an image photographed by the photographing device and detect a touch on a surface and generate a signal corresponding to a detected position,
    wherein the detection area setting unit sets the detection area based on the signal detected on the surface of the touch screen.

8. The photographing apparatus of claim 7, wherein the detection area setting unit is further configured to change the detection area to another position in the image according to an input by a user.

9. The photographing apparatus of claim 7, wherein the detection area setting unit is further configured to change the size of the detection area by an input by a user.

10. The photographing apparatus of claim 1, further comprising:
a continuous photography setting unit configured to determine, in advance of photographing, whether to perform continuous photography and configured to determine the number of photos to be photographed when the photographing control unit operates the photographing device to perform photography,
wherein the number of photos to be photographed is determined based on the preset sensitivity range.

11. A photographing method comprising:
setting a part of an image to be photographed as a detection area;
detecting a change of an object in the detection area;
performing photography when a degree of the change of the object exceeds a preset sensitivity range; and
tracking the object by changing the detection area according to the movement of the object when the object to be detected is out of the detection area.

12. The photographing method of claim 11, wherein, in the detecting of a change of an object in the detection area, the change of the object in the detection area is detected by recognizing a change in at least one of brightness, saturation, and edge.

13. The photographing method of claim 11, wherein, in the detecting of a change of an object in the detection area, when the object to be detected is a person, a face of the person is recognized and a change in the expression of the face is detected.

14. The photographing method of claim 11, wherein, in the tracking the object by changing the detection area, the detection area is changed when a change in the detection area is within the present sensitivity range and the object to be detected is out of the detection area.

15. The photographing method of claim 11, further comprising:
displaying an image that is to be photographed; and
receiving an input by a user,
wherein, in the setting of a part of an image to be photographed as a detection area, the detection area is set in the image displayed based on the input by the user in the receiving of an input by a user.

16. The photographing method of claim 15, further comprising changing the detection area to another position in the image according to the input by the user.

17. The photographing method of claim 15, wherein, in the setting of a part of an image to be photographed as a detection area, the size of the detection area is changed by the input by the user.

18. The photographing method of claim 11, further comprising determining, in advance, whether to perform continuous photography and the number of photos to be photographed when photography is performed in the performing of photography.

19. A computer program product, comprising a non-transitory computer usable medium having a computer readable program code embodied therein, said computer readable program code adapted to be executed to implement a method for photographing, said method comprising:
setting a part of an image to be photographed as a detection area;
detecting a change of an object in the detection area;
performing photography when a degree of the change of the object exceeds a preset sensitivity range; and
tracking the object by changing the detection area according to the movement of the object when the object to be detected is out of the detection area.

* * * * *

UNITED STATES PATENT AND TRADEMARK OFFICE
CERTIFICATE OF CORRECTION

| | |
|---|---|
| PATENT NO. | : 8,508,602 B2 |
| APPLICATION NO. | : 12/702417 |
| DATED | : August 13, 2013 |
| INVENTOR(S) | : Jung-yoon Won et al. |

It is certified that error appears in the above-identified patent and that said Letters Patent is hereby corrected as shown below:

ON THE TITLE PAGE, Item (54) and in the Specifications, at Column 1, lines 1-5, Title, replace "PHOTOGRAPHING APPARATUS METHOD, AND COMPUTER USABLE MEDIUM FOR PHOTOGRAPHING AN OBJECT WITHIN A DETECTION AREA BASED ON A CHANGE OF THE OBJECT" with --PHOTOGRAPHING APPARATUS, METHOD, AND COMPUTER USABLE MEDIUM FOR PHOTOGRAPHING AN OBJECT WITHIN A DETECTION AREA BASED ON A CHANGE OF THE OBJECT--

IN THE CLAIMS:

In Claim 2, Column 10, line 35, replace "detection unit is configured to detect, a change of the object" with --detection unit is configured to detect a change of the object--

In Claim 3, Column 10, lines 39-40, replace "detection unit is further configured to recognize a face of the person and detect, a change in the expression of the face" with --detection unit is further configured to recognize a face of the person and detect a change in the expression of the face--

Signed and Sealed this
Third Day of December, 2013

Margaret A. Focarino
*Commissioner for Patents of the United States Patent and Trademark Office*